Jan. 1, 1924
D. W. JOYNER
SAFETY WAREHOUSE TRUCK
Filed Dec. 22, 1921
1,479,612
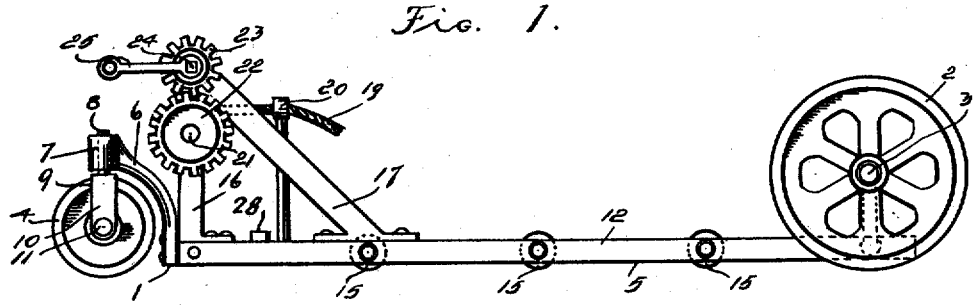
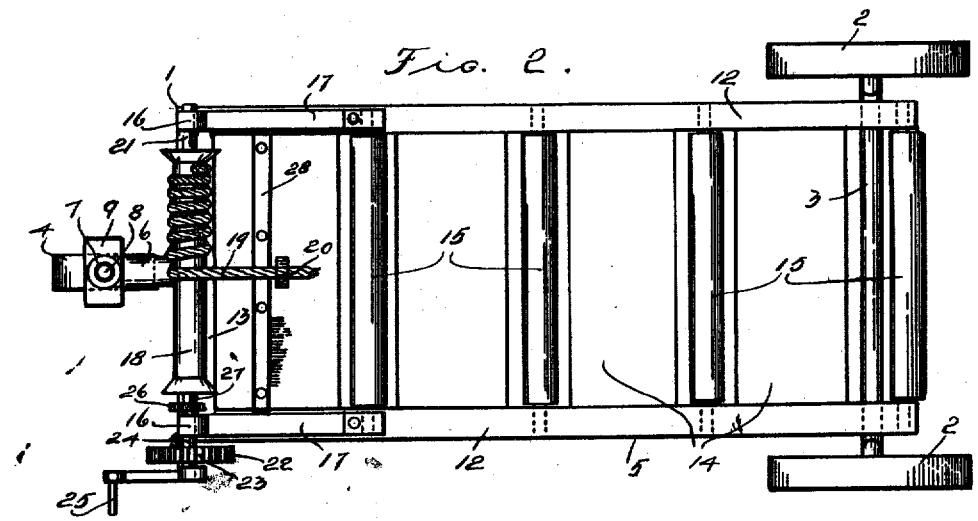
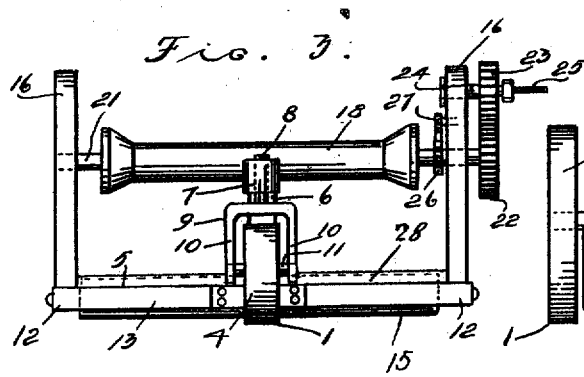
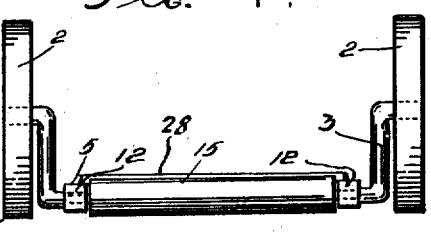
INVENTOR.
Daniel Wright Joyner.
BY
M. C. Gillham.
ATTORNEY.

Patented Jan. 1, 1924.

1,479,612

UNITED STATES PATENT OFFICE.

DANIEL WRIGHT JOYNER, OF KANSAS CITY, MISSOURI.

SAFETY WAREHOUSE TRUCK.

Application filed December 22, 1921. Serial No. 524,289.

*To all whom it may concern:*

Be it known that I, DANIEL WRIGHT JOYNER, a citizen of the United States, residing at Kansas City, in the county of Jackson and State of Missouri, have invented a new and useful Safety Warehouse Truck, of which the following is a specification.

My invention relates to safety warehouse trucks, and particularly to a three wheeled vehicle of this character which is used to transport heavy objects, such as safes, machinery, apparatus and the like.

The object of the invention is to provide a safety warehouse truck with an underhung bed which may be easily loaded, moved, and unloaded with safety and economy, saving considerable time, labor and expense.

Another object is to provide a truck of this character which will be safe from overturning its load or itself, thereby, eliminating the chance of accidental injury to workmen when using the truck.

I attain these objects by means of the mechanism and structure illustrated in the accompanying drawing in which—Figure 1, is a side elevation of a warehouse truck which embodies my invention; Figure 2, is a top plan view of the same; Figure 3, is a front end view of the same and, Figure 4, is a rear end view of the same.

Similar numerals of reference refer to corresponding parts throughout the several views.

Referring to the drawings—the numeral 1, designates a three wheeled warehouse truck which embodies my invention, and which comprises bearing wheels 2, which turn on the opposite ends of an underhung axle 3, a centrally disposed pilot wheel 4, and a bed 5, which is mounted, at its rearward end, on the underhung portion of the axle 3, and at its forward end suitably mounted on the pilot wheel 4. On the front end of the bed is mounted a bearing member 6, having a pivot bearing 7, in which a pivot 8, turns, which pivot is integral with the upper end of a wheel bearing member 9, having downwardly extending spaced arms 10, in which the axle 11, of the pilot wheel 4, is revolubly mounted, and in such a manner that the bed 5, shall be suspended thereby to lie in a horizontal plane. The bed 5, comprises side members 12, front transverse member 13, spaced apart transverse plates 14, which are connected between the side members for the purpose of providing rigidity in the bed and, at the same time, to form of the plates a platform. Rollers 15, are revolubly mounted in the side members 12, and operate in the spaces between the plates 14, the rollers being so mounted that their upper sides shall lie in a plane a little higher than the plane of the plates, to facilitate the moving of loads over the rollers without touching the plates. One of the rollers 15, is mounted adjacent the rear end of the bed to facilitate the moving objects from the warehouse floors to the bed of the truck and, likewise, materially facilitate the unloading of the truck. At the forward ends of the side members 12, are vertical standards 16, which are substantially braced inwardly of the bed by inclined braces 17, and in the upper end portions of the standards is revolubly mounted a drum 18, upon which is wound a cable 19, which passes rearwardly of the truck through a guide 20, which is mounted on the bed. On one outer end of the drum axle 21, is mounted a gear wheel 22, which is enmeshed with a gear wheel 23, on a revoluble shaft 24, mounted in the adjacent standard 16, above the wheel 22. On the outer end of the shaft 24, is a crank 25, to turn the wheel 23, and thereby actuate the drum, in the well known manner of a windlass. A ratchet wheel 26, is mounted on the shaft 21, and is engaged by a dog 27, which is pivoted on the standard 16, to prevent backward rotation of the drum. A bumper 28, is mounted transversely on the forward portion of the bed to limit the forward movement of the object loaded on the truck.

It is my experience that the loading, moving, and unloading of heavy cumbersome objects in warehouses on the conventional three wheeled truck, is laborious and requires a large number of workmen to lift the object from the floor to and upon the bed of the truck, moreover, this practice is dangerous, since in raising the object to the high bed of the truck makes overturning of the object possible and the use of pinch bars to pry the object is also a hazard to workmen, as well as very slow and tedious, requiring much time.

The underslung truck embodying my invention may be used with safety, by a few workmen, and at a great saving in time. The object to be loaded, for instance a heavy dynamo, is elevated sufficiently at one side thereof to permit the placing thereunder a roller of sufficient diameter to elevate the object so that the rear end of the truck may be passed under the object and bring the rear roller 15, thereunder. The cable is then attached to the object and the drum actuated to wind thereon the cable, thereby pulling the object forward upon the bed 5, and on and over the rollers thereon, to and against the bumper 28, where it is held secure. Thus the load may be carried by the truck without danger of overturning should the pilot wheel of the truck run into a crack in the floor or depression of any kind, or be steered upon a short radius, in the former case the underhung bed would bear upon the floor and prevent overturning of the load, and in the latter case, the gravity of the load being below the wheel centers, it would not lose its center of gravity, as generally happens when the conventional truck encounters the situations mentioned. When unloading the object the drum is released and permitted to rotate in backward direction and the object is pushed back on the rollers 15, and off the bed to the floor. To prevent a sudden drop of the object to the floor, the cable is paid out gradually.

Having described my invention what I claim is—

1. A safety warehouse truck, comprising an underslung rear axle provided with bearing wheels, a bed supportingly engaged by the underslung portion of said axle, a pivotally mounted bearing wheel connected with the front end of said bed and adapted for holding with said axle the bed in a horizontal plane, a plurality of rollers revolubly mounted transversely of said bed and arranged to turn therein by objects moved thereon, pulling means mounted on said bed and adapted for pulling objects over said rollers thereon, and a bumper arranged on said bed to limit the forward movement of objects on said rollers.

2. A safety warehouse truck, comprising an underslung rear axle provided with bearing wheels, a bed supportingly engaged by the underslung portion of said axle, a pivotally mounted bearing wheel connected with the front end of said bed and adapted for holding with said axle the bed in a horizontal plane, a plurality of rollers revolubly mounted transversely of said bed and arranged to turn therein by objects moved thereon, and pulling means mounted on said bed and adapted for pulling objects over said rollers thereon.

Dated Kansas City, Mo., December 20th, 1921.

DANIEL WRIGHT JOYNER.

Witnesses:
JOHN C. STEARNS,
ELIAS BERELL.